(12) United States Patent
Nishigaki et al.

(10) Patent No.: US 8,243,287 B2
(45) Date of Patent: Aug. 14, 2012

(54) PROJECTOR

(75) Inventors: Hiroshi Nishigaki, Daito (JP); Atsuya Hirano, Daito (JP); Atsuhiko Chikaoka, Daito (JP); Ken Nishioka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 254 days.

(21) Appl. No.: 12/754,871

(22) Filed: Apr. 6, 2010

(65) Prior Publication Data
US 2010/0253860 A1 Oct. 7, 2010

(30) Foreign Application Priority Data

Apr. 7, 2009 (JP) .................................. 2009-092777

(51) Int. Cl.
*G01B 11/14* (2006.01)
(52) U.S. Cl. ........................................................ 356/614
(58) Field of Classification Search .................. None
See application file for complete search history.

(56) References Cited

U.S. PATENT DOCUMENTS

| 5,738,429 | A | 4/1998 | Tagawa et al. |
| 6,097,374 | A | 8/2000 | Howard |
| 6,650,318 | B1 | 11/2003 | Arnon |
| 6,933,957 | B2 * | 8/2005 | Omori et al. ............... 347/249 |
| 7,173,605 | B2 | 2/2007 | Fong et al. |
| 7,497,578 | B2 * | 3/2009 | Wood ............................ 353/43 |
| 2004/0125147 | A1 | 7/2004 | Liu et al. |
| 2006/0221063 | A1 | 10/2006 | Ishihara |
| 2009/0219262 | A1 | 9/2009 | Champion et al. |

FOREIGN PATENT DOCUMENTS

JP 2002-14763 A 1/2002

OTHER PUBLICATIONS

European Search Report dated Jul. 7, 2010 (seven (7) pages).

* cited by examiner

*Primary Examiner* — Tu Nguyen
(74) *Attorney, Agent, or Firm* — Crowell & Moring LLP (57) ABSTRACT

A projector includes a determination section, an amplification section, an identification section and a calculation section. The determination section specifies a reflection position of a reflected light received by a light receiving sensor based on a horizontal synchronizing signal and a pixel clock signal of an image signal, and determines an amplification quantity of the intensity of a reflected light reflected at the specified reflection position to be received by the light receiving sensor. The amplification section amplifies the intensity of the reflected light received by the light receiving sensor by the determined amplification quantity. The identification section identifies an external obstacle when the intensity of the amplified reflected light exceeds a predetermined threshold value. The calculation section calculates the position information of the external obstacle based on the timing of identifying the external obstacle, the horizontal synchronizing signal, and the pixel clock signal of the image signal.

6 Claims, 10 Drawing Sheets

| POSITION | ANALOG GAIN (dB) | DIGITAL GAIN IN X DIRECTION (dB) | DIGITAL GAIN IN Y DIRECTION (dB) |
|---|---|---|---|
| ( Xa, Ya ) | | | |
| ( Xb, Yb ) | | | |
| ... | | | |
| ... | | | |

| AREA | ANALOG GAIN (dB) | DIGITAL GAIN IN X DIRECTION (dB) | DIGITAL GAIN IN Y DIRECTION (dB) |
|---|---|---|---|
| A1 | | | |
| B1 | | | |
| ... | | | |
| A2 | | | |
| ... | | | |
| B3 | | | |
| ... | | | |

PROJECTOR

BACKGROUND OF THE INVENTION

1. Field of the Invention

The present invention relates to a projector.

2. Description of Related Art

A laser projector is known hitherto as a projector projecting an image input from the outside with a laser light. Because this projector is used by projecting an image at a distant position generally, it is necessary for a user to use a pointing rod reaching the position of the image from the position of the user or a laser pointer performing laser irradiation to the image in order that the user points a desired point in the projected image. Moreover, if other information equipment connected to the projector inputs an image, then the user points a desired point with an input device, such as a touch panel or a mouse, equipped in the other information equipment.

However, there is frequently the case where it becomes a burden for the user to point a desired point with a point device, such as the pointing rod or the laser pointer, or the input device, such as the touch panel or the mouse, in some environments of the installation of the projector.

Here, for example, among position measuring apparatus, each measuring a position of a light source, radiating a diffused light, at least on a two-dimensional plane, one equipped with a plurality of measurement units, each outputting a received light quantity of the diffused light from the light source in a light receiving plane region formed on a plurality of planes intersecting with one another, and adjustment means for performing gain adjustments of received light quantities in order that the received light quantities in two light receiving plane regions or two light receiving planer region groups may be almost equal to each other when the light source is arranged on a straight line forming an angle of 45 degrees around the central axis of the two light receiving plane regions or the two light receiving plane region groups in the measurement unit is known (see, for example, Japanese Patent Application Laid-Open Publication No. 2002-014763).

The invention described in this publication (JP-A-2002-014763) derives the position on a plane of the light source on the basis of the light quantities in an X direction and a Y direction, respectively, detected from two light receiving elements arranged in the directions crossing at right angles by a calculation section through a predetermined driving formula. The invention can calculate the more accurate position of the light source on the plane by suppressing the dispersion of the light quantities in the X and Y directions, respectively, by adjusting the gains of the two light receiving elements with the adjustment means.

Consequently, if a pointing position can be projected by providing the position measuring apparatus disclosed in the aforesaid publication to a projector, then it is unnecessary to point a desired point with a pointing device, such as a pointing rod and a laser pointer, or an input device, such as a touch panel and a mouse.

However, because the invention described in the aforesaid publication has to derive coordinate values by the calculation section on the basis of the received light quantities through complicated arithmetic processing, an increase of the burden of processing of a central processing unit (CPU) or the like for the detection of a position is apprehended.

Moreover, the accuracy itself of the identification of an external obstacle (for example, the tip of a pointing rod and the tip of a finger) for pointing a point becomes a problem by the invention described in the aforesaid publication. That is, because the attenuation rate of a light intensity and a signal to noise (S/N) ratio change according to a position at which the external obstacle exists, the accuracy of the identification of the external obstacle disperses according to the position thereof, and it is apprehended that the external obstacle is erroneously identified.

It is an object of the present invention to provide a projector capable of easily executing the position detection of an external obstacle and having the high accuracy of the identification of the external obstacle.

SUMMARY OF THE INVENTION

According to a first aspect of the present invention, there is provided a projector including: a laser light source to supply a laser light according to an input image signal; a scanning section to perform scanning with the laser light supplied from the laser light source; a beam splitter to divide the laser light, scanned by the scanning section, into a first direction and a second direction to output the divided laser lights; a light receiving sensor to receive a reflected light of a first laser light output into the first direction by the beam splitter; a determination section to specify a reflection position of the reflected light received by the light receiving sensor based on a horizontal synchronizing signal and a pixel clock signal of the image signal, and to determine an amplification quantity of an intensity of the reflected light reflected at the specified reflection position to be received by the light receiving sensor; an amplification section to amplify the intensity of the reflected light received by the light receiving sensor according to the amplification quantity determined by the determination section; an identification section to identify an external obstacle when the intensity of the reflected light amplified by the amplification section exceeds a predetermined threshold value; and a calculation section to calculate position information of the external obstacle based on a timing of identification of the external obstacle by the identification section, the horizontal synchronizing signal, and the pixel clock signal.

According to a second aspect of the present invention, there is provided a projector including: a laser light source to supply a laser light according to an input image signal; a scanning section to perform scanning with the laser light supplied from the laser light source; a beam splitter to divide the laser light, scanned by the scanning section, into a first direction and a second direction to output the divided laser lights; a light receiving sensor to receive a reflected light of a first laser light output into the first direction by the beam splitter; a determination section to specify a reflection position of the reflected light received by the light receiving sensor based on a horizontal synchronizing signal and a pixel clock signal of the image signal, and to determine an amplification quantity of an intensity of the reflected light reflected at the specified reflection position to be received by the light receiving sensor; an amplification section to amplify the intensity of the reflected light received by the light receiving sensor according to the amplification quantity determined by the determination section; an identification section to identify an external obstacle when the intensity of the reflected light amplified by the amplification section exceeds a predetermined threshold value; and a calculation section to calculate position information of the external obstacle based on a timing of identification of the external obstacle by the identification section, the horizontal synchronizing signal, and the pixel clock signal, wherein the amplification section includes: an analog amplification section to amplify an analog light intensity signal according to the intensity of the reflected light received by the light receiving sensor, and a digital amplification section to amplify a digital light intensity signal generated by performing an analog to digital (A/D) conversion of the analog light intensity signal amplified by the analog amplification section; and the determination section determines the amplification quantity based on a distance between the reflection position of the reflected light received by the light receiving sensor and the light receiving sensor.

According to the present invention, because the invention is configured in order that the determination section specifies the reflection position of the reflected light received by the light receiving sensor and determines the amplification quantity of the intensity of the reflected light reflected at the specified reflection position to be received by the light receiving sensor, it becomes possible to adjust the amplification quantity in consideration of the influences of the attenuation rate of the light intensity of the reflected light and the like according to the reflection position, and consequently it is possible to suppress the dispersion of the accuracy of the identification of an external obstacle according to the reflection position. Moreover, because the calculation section can easily calculate the position information of the external obstacle on the basis of the timing of identifying the external obstacle with the identification section, the horizontal synchronizing signal, and the pixel clock signal, no particular configurations for detecting the position of the external obstacle are needed. Moreover, because the calculation of the position information is not performed on the basis of the light quantity of the reflected light received by the light receiving sensor, no complicated operation are also needed.

Consequently, the present invention can be said to be a projector that can easily execute the position detection of the external obstacle and that can perform the identification of the external obstacle with high identification accuracy.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, an embodiment of the present invention will be described with reference to the attached drawings. The scope of the invention is not limited to the illustrated examples.

Figure 1:
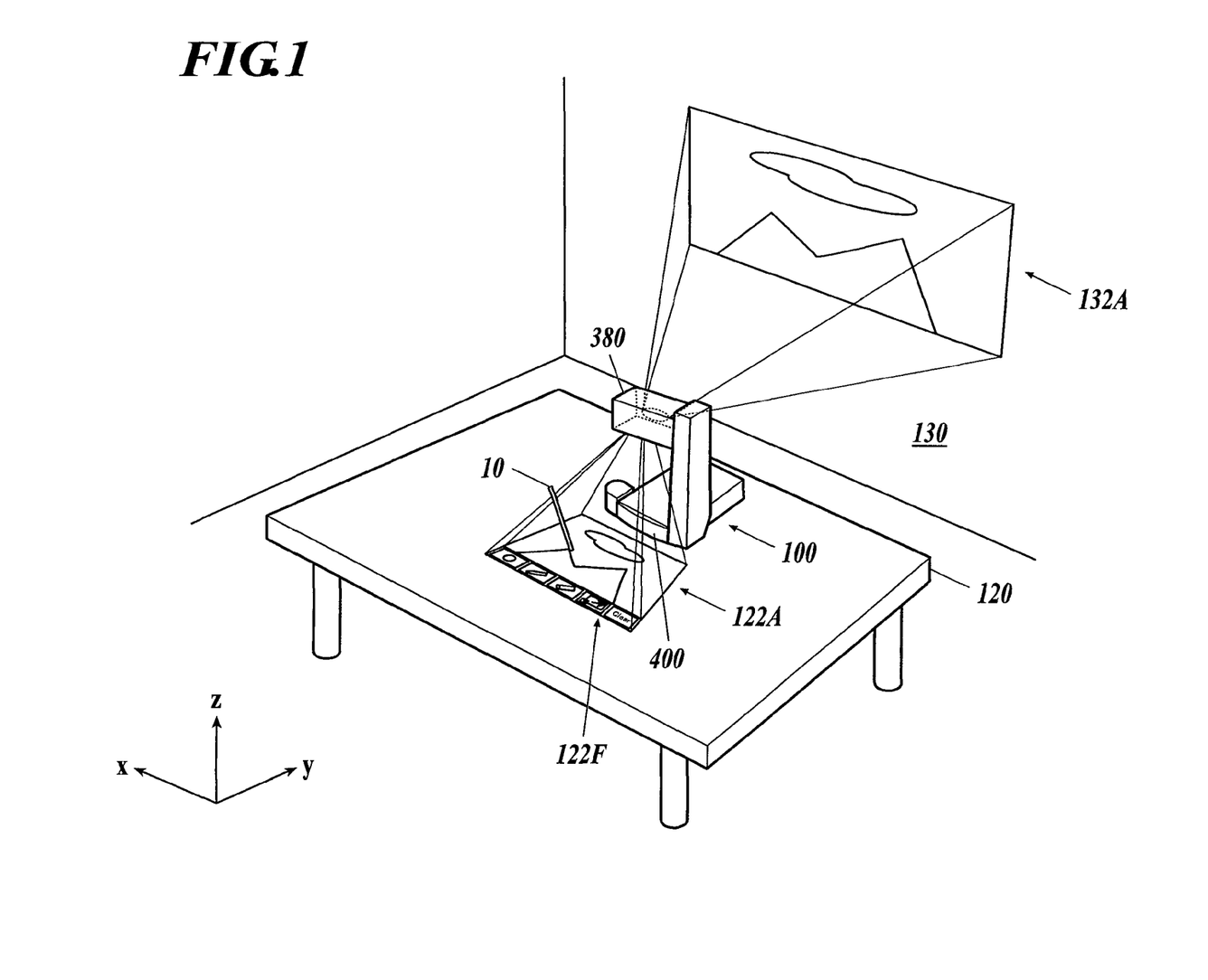
FIG. 1 is an external view illustrating a state in which a projector according to the present invention is installed.

Moreover, in the following description, the right-left direction of a projector 100 in FIG. 1 is set as an X direction; the front-back direction thereof is set as a Y direction; and the height direction thereof is set as a Z direction.

The projector 100 is installed on, for example, a table 120 as shown in FIG. 1. The projector 100 is a laser projector projecting a laser light (second laser light) emitted toward a screen 130 to form a displaying image 132A, to be used for presentation and the like by a projection section 380.

Moreover, the projector 100 projects an image 122A similar to the image 132A (the size of the image 122A is generally smaller than that of the image 132A) onto the top surface of the table 120 with a laser light (first laser light) split by the projection section 380 in order that a user of the projector 100 can refer to the image 122A. Here, the image 122A includes an image 122F for the user's editing and the like of the image 132A by a user's operation of an external obstacle 10, such as a rod and a pen. Then, the projector 100 is configured to identify the external obstacle 10 by detecting a reflected light from the external obstacle 10 with a light receiving sensor 400.

Figure 2:
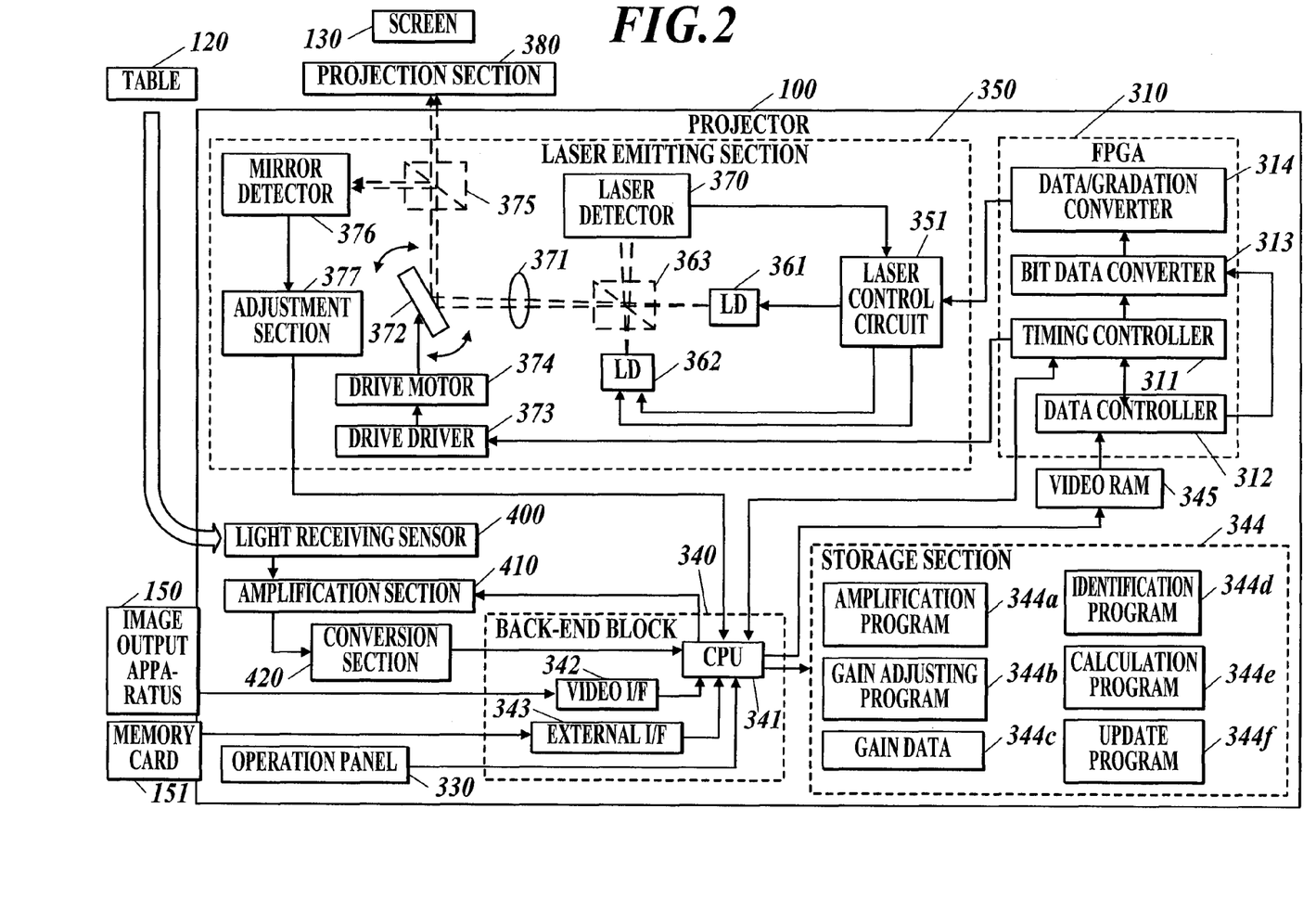
FIG. 2 is a block diagram illustrating the configuration of the principal part of the projector according to the present invention.

Next, the projector 100 is configured to include, for example, as shown in FIG. 2, a front-end field programmable gate array (FPGA) 310, a laser emitting section 350, the projection section 380, an operation panel 330, a back-end block 340, a video random access memory (RAM) 345, the light receiving sensor 400, an amplification section 410, a conversion section 420, and a storage section 344.

The FPGA 310 is, for example, a programmable large scale integration (LSI), including a timing controller 311, a data controller 312, a bit data converter 313, and a data/gradation converter 314, to perform the display control of an image signal to be temporarily stored in the video RAM 345 together with the back-end block 340.

The timing controller 311 reads out the image signal, temporarily stored in the video RAM 345, through the data controller 312 on the basis of an instruction transmitted from a CPU 341, included in the back-end block 340. Then, the timing controller 311 obtains the synchronizing signals (including a horizontal synchronizing signal (HSYNC), a pixel clock signal (PCLK), and the like) included in the image signal. Furthermore, the timing controller 311 generates commands for controlling the timings of the emitting and the driving of the laser emitting section 350 and a drive motor 374, respectively, both of which will be described later, on the basis of the synchronizing signals to transmit the commands to the bit data converter 313 and a drive driver 373, respectively.

The data controller 312 transmits an image signal read out from the video RAM 345 to the bit data converter 313.

The bit data converter 313 converts the image signal transmitted from the data controller 312 into data suited for a format for projecting the image signal transmitted from the data controller 312 with a laser light on the basis of the command transmitted from the timing controller 311, and the bit data converter 313 transmits the converted image signal to the data/gradation converter 314.

The data/gradation converter 314 converts the data output from the bit data converter 313 into a gradation of colors for displaying the data as three colors of a red (R), a green (G), and a blue (B), and transmits each data after the conversion to the laser emitting section 350.

The laser emitting section 350 is configured to include, for example, a laser diodes (LD) 361 and 362 (laser light sources), a laser control circuit 351, a polarization beam splitter 363, a laser detector 370, a lens 371, a scanner mirror 372 (scanning section), the drive driver 373, the drive motor 374, a half mirror 375, a mirror detector 376, and an adjustment section 377.

The laser diode (LD) 361 is a diode emitting a laser light of a green color, and the LD 362 is a diode emitting laser lights of a red color and a blue color. Each of the LDs 361 and 362 are controlled by the laser control circuit 351.

Although the LD 362 according to the present embodiment is configured by integrating an LD emitting a laser light of a red color and an LD emitting a laser light of a blue color to be a body, the LD 362 may be separately configured ones.

The laser control circuit 351 controls the emission quantities, the timings, and the like of the LDs 361 and 362 on the basis of a signal transmitted from the data/gradation converter 314. Moreover, the laser control circuit 351 detects the emission states of laser lights on the basis of their output quantities detected by the laser detector 370, which will be described later, and performs the emission control of the LDS 361 and 362 on the basis of the emission states.

The polarization beam splitter 363 is an optical member arranged in the optical path of the laser light emitted from the LD 361 to split an entering laser light into a P polarized light and an S polarized light. Then, the polarization beam splitter 363 transmits a part of a laser light of the green color emitted from the LD 361 toward the lens 371, and makes the residual laser light reflect toward the laser detector 370. On the other hand, the polarization beam splitter 363 transmits parts of the laser lights of the red color and the blue color emitted from the LD 362 to the laser detector 370, and makes the residual laser lights reflect toward the lens 371.

The laser detector 370 is, for example, a sensor detecting the output quantity of a laser light, and is arranged in the optical path of a laser light emitted from the LD 362.

The lens 371 condenses laser lights transmitted from the polarization beam splitter 363.

The scanner mirror 372 is, for example, a galvanometer mirror rotatable in two axis directions independently by receiving a driving force given by the drive motor 374, which will be described later. By adjusting the inclination angle of the scanner mirror 372 by rotating it, it is possible to adjust the reflecting direction of an incident light.

Figure 3:
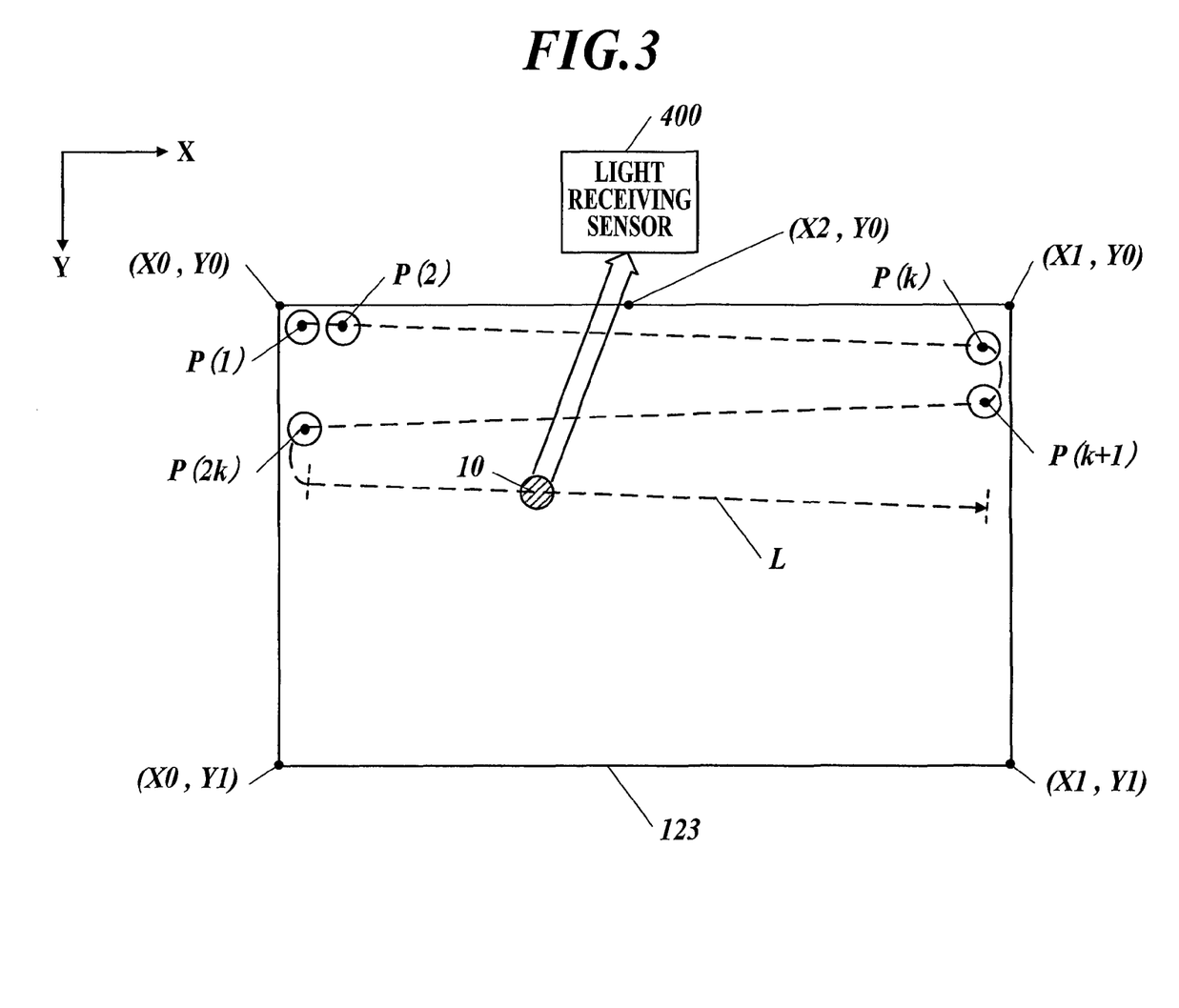
FIG. 3 is a diagram for describing a projection surface of a laser light according to the present invention.

Consequently, as shown on, for example, a projection surface 123 of a laser light (first laser light) formed on the table 120 of FIG. 3, it becomes possible to perform scanning with a laser light by sequentially adjusting the reflecting direction of the laser light transmitting the lens 371 with the scanner mirror 372.

Figure 4:
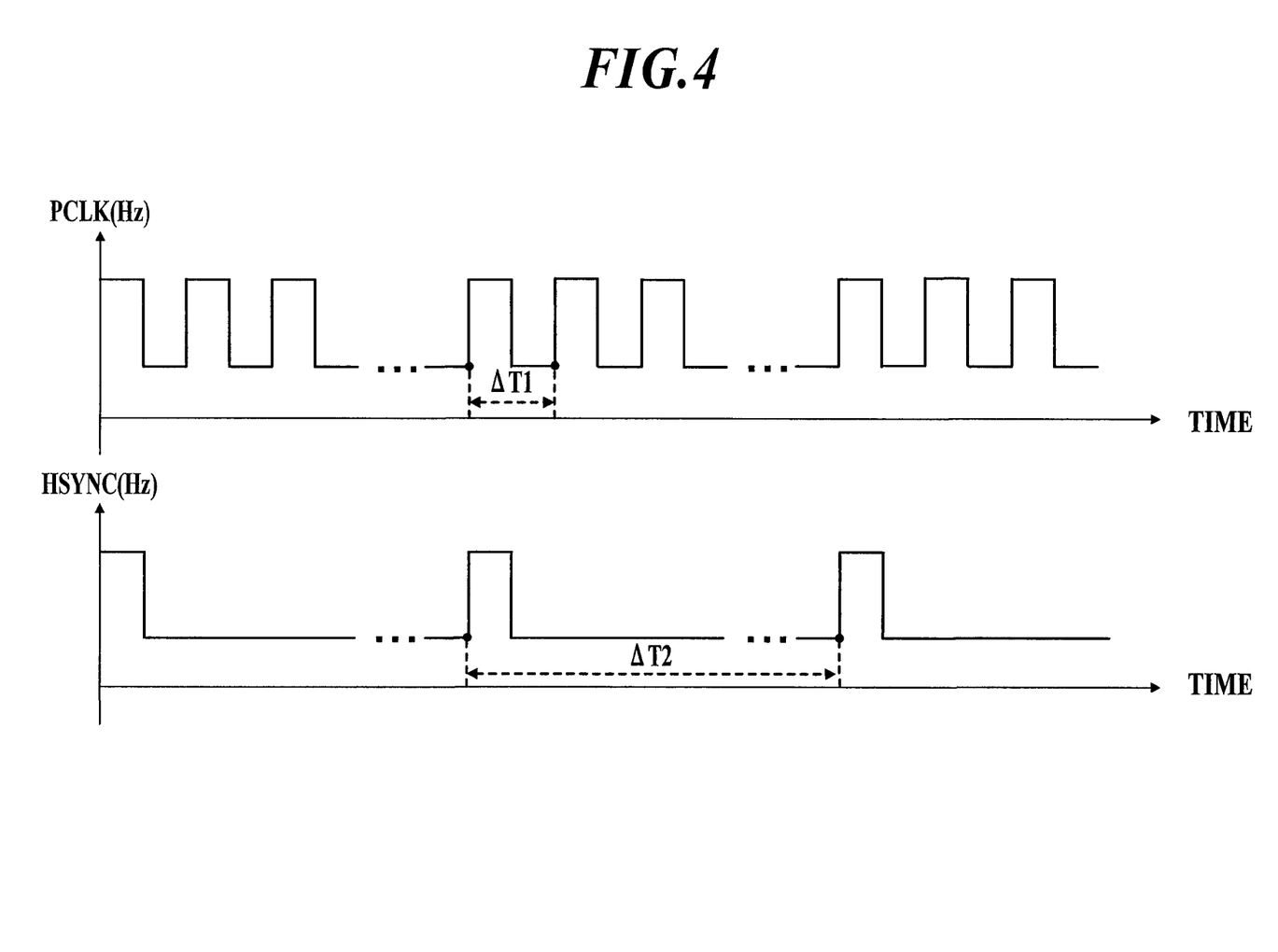
FIG. 4 is a diagram for describing synchronizing signals (horizontal synchronizing signal and pixel clock signal) according to the present invention.

Here, FIG. 3 shows that the scanning position of a laser light is sequentially changed to positions P(1), P(2) . . . , P(k), P(k+1), . . . , P(2k), . . . by the scanner mirror 372 in the projection surface 123 according to a pixel clock signal and a horizontal synchronizing signal obtained by the timing controller 311. Moreover, the pixel clock signal (PCLK) and the horizontal synchronizing signal (HSYNC) are, for example, the signals severally showing the pulse waveforms as shown in FIG. 4. In FIG. 4, a time ΔT1 denotes a time for rendering one pixel, and a time ΔT2 denotes a time until switching one scanning line.

That is, the scanner mirror 372 inclines into the X direction during the time ΔT1 of the pixel clock signal, and the scanning position of the laser light shown in FIG. 3 is shifted into the X direction (for example, changes from the position P(1) to the position P(2)). Then, the scanning into the X direction is repeated, and the time ΔT2 of the horizontal synchronizing signal has elapsed at the timing when the scanning position has reached the end of the projection surface 123 in the X direction (for example, the position P(k)). Then, the horizontal synchronizing signal is detected at that timing. The scanner mirror 372 inclines into the Y direction during the time ΔT2, and the scanning position of the laser light shown in FIG. 3 is shifted into the Y direction (for example, changes from the position P(k) to the position P(k+1).

Consequently, the scanner mirror 372 repeats the scanning mentioned above on the basis of the pixel clock signal and the horizontal synchronizing signal, and an image projection for one frame is completed at a time point when the scanning has performed over the whole projection surface 123.

The drive driver 373 controls the scanning with a laser light by the scanner mirror 372 by, for example, giving a pulse signal corresponding to the drive frequency of the drive motor 372 in conformity with a command transmitted from the timing controller 311.

The drive motor 374 is, for example, two pulse motors connected to the two axes of the scanner mirror 372, respectively, the two pulse motors are configured to severally drive the scanner mirror 372 on the basis of a drive frequency (resonance frequency) instructed by the drive driver 373, which will be described later, to rotate the scanner mirror 372 by a predetermined angle.

The half mirror 375 transmits a part of the laser light reflected by the scanner mirror 372 toward the projection section 380, and reflects the residual part thereof toward the mirror detector 376.

The mirror detector 376 is, for example, an inclination angle detector for receiving a laser light reflected by the half mirror 375 to detect the inclination angles (deflection angles) in the two axis directions of the scanner mirror 372. The inclination angles detected by the mirror detector 376 are input into the adjustment section 377 as analog electric signals.

The adjustment section 377 is configured to include, for example, an arithmetical operator, a comparator, an analog signal amplifier, an A/D converter, and the like, although the diagrammatic representation of these components is omitted. The adjustment section 377 is configured to adjust the analog electric signals concerning the inclination angles of the scanner mirror 372 input from the mirror detector 376 to desired values by amplifying the analog electric signals, performing the arithmetical operations of them, comparing them to the desired values, and the like, and to convert the adjusted analog electric signals into digital signals and transmit the converted digital signals to the CPU 341.

That is, because it is apprehended that the resonance frequency of the scanner mirror 372 changes according to the installation environment (for example, temperature, humidity, atmospheric pressure, and the like) thereof to cause the shifts of the scanning positions of a laser light, the scanner mirror 372 is configured in order that the inclination angle thereof is detected by the mirror detector 376 and the adjustment section 377 to be transmitted to the CPU 341, and that the CPU 341 and the timing controller 311 can accordingly adjust the drive frequency by the drive driver 373 in order.

Figure 5:
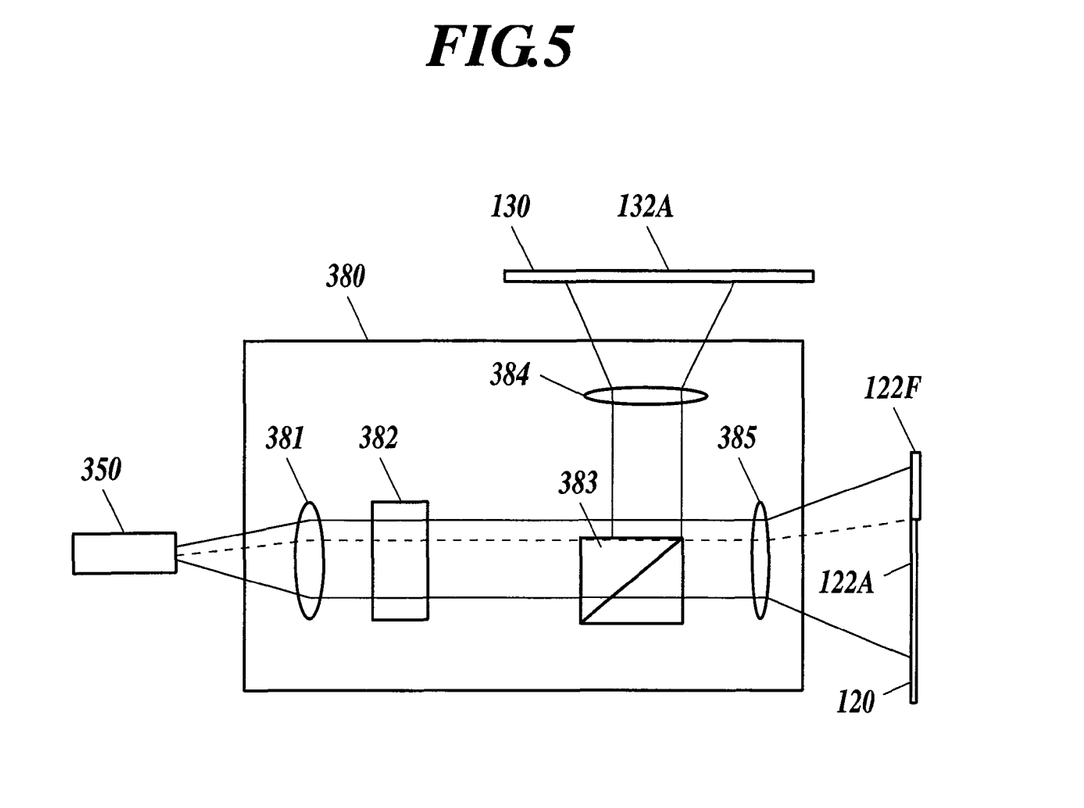
FIG. 5 is a diagram for describing the configuration of a projection section according to the present invention and a state in which the projection section performs projections with laser lights.

The projection section 380 is configured to include, for example, as shown in FIG. 5, a collimation lens 381, a spatial light modulator 382, a beam splitter 383, and expansion lenses 384 and 385, and the projection section 380 projects an image on the screen 130 and the table 120 with a laser light emitted from the laser emitting section 350 (used for scanning by the scanner mirror 372).

The collimation lens 381 changes a laser light used for scanning by the scanner mirror 372 to a parallel light.

The spatial light modulator 382 is, for example, a light bulb or the like transmitting only a light having a predetermined polarization direction. The spatial light modulator 382 modulates the transmittance of a laser light transmitting the collimation lens 381 to be changed to a parallel light according to an image signal, and emits the parallelized laser light to the beam splitter 383.

The beam splitter 383 is arranged so that only a part of a laser light emitted from the spatial light modulator 382 may enter the beam splitter 383, and splits the incident laser light into a first laser light transmitted into the direction of the table 120 (first direction) and a second laser light reflected into the direction of the screen 130 (second direction).

Consequently, a part of the laser light passing the optical path in which the beam splitter 383 is arranged transmits the beam splitter 383 to be projected into the direction of the table 120, and a part of the residual laser light is reflected (refracted) by the beam splitter 383 to be projected into the direction of the screen 130. On the other hand, the laser light passing an optical path in which the beam splitter 383 is not arranged is projected only into the direction of the table 120 without being reflected (refracted) by the beam splitter 383.

That is, the CPU 341 enables the projection of the image 132A for presentation on the screen 130 and the image 122A on the table 120 by controlling the FPGA 310 and the laser emitting section 350 in order that the laser light for displaying the image 132A may pass the optical path in which the beam splitter 383 is arranged, and that the laser light for displaying the image 122F dedicated for performing the editing of the image 132A and the like may pass the optical path in which the beam splitter 383 is not arranged.

The dedicated image 122F may also be, for example, an image including a comment corresponding to the presently projected image 132A. Thereby, only a user can refer to the dedicated image 122F during a display of the image 132A. That is, even if the user does not remember the comment to be stated during the display of the image 132A, it becomes possible for the user to advance the presentation smoothly.

The expansion lens 384 is arranged downstream from the beam splitter 383 in the direction of the screen 130 to expand the laser light reflected by the beam splitter 383. The expansion lens 385 is arranged downstream from the beam splitter 383 in the direction of the table 120 to expand the laser light transmitting the beam splitter 383 and the laser light passing the optical path in which the beam splitter 383 is not arranged.

Then, the laser lights expanded by the expansion lenses 384 and 385 are radiated to the screen 130 and the table 120, respectively, through mirrors and lenses, both being not shown.

The operation panel 330 is configured to include, for example, a display apparatus (not shown), provided on the top surface or a side surface of the housing section of the projector 100 for displaying the operation contents, and buttons and switches (not shown) for a user to execute an input operation to the projector 100. Then, when a user executes an operation, the operation panel 330 transmits a signal corresponding to the operation to the CPU 341.

The back-end block 340 is the back-end section of the projector 100 configured to include, for example, the CPU 341, a video interface (I/F) 342, and an external I/F 343.

The CPU 341 reads out various processing programs stored in the storage section 344, and executes the programs to transmit output signals to the respective sections. Thereby, the CPU 341 performs the integrated control of the whole operation of the projector 100.

Moreover, the CPU 341 controls the projection of an image based on an image signal input into the projector 100 through the video I/F 342 and the external I/F 343 on the basis of a signal transmitted from the operation panel 330. That is, the CPU 341 performs mutual communication with the timing controller 311 of the FPGA 310 to control the display of the image based on an image signal temporarily held in the video RAM 345.

The video I/F 342 is, for example, an interface connected to an image output apparatus 150, such as a personal computer (PC), for inputting an image signal output from the image output apparatus 150.

The external I/F 343 is, for example, an interface for an external storage medium, capable of installing a memory card 151, such as a universal serial bus (USB) flash memory and a SD memory card, and the external I/F 343 can read out an image signal stored in the memory card 151 to input the read-out image signal into the projector 100.

The video RAM 345 temporarily stores an image signal input through the video I/F 342 or the external I/F 343. Then, the image signal is configured so as to be read out from the timing controller 311 (data controller 312) at the time of performing the display control by the FPGA 310.

The light receiving sensor 400 is configured to include, for example, a light receiving element, such as a photodiode, and a lens, although their diagrammatic representation is omitted. The light receiving sensor 400 is a sensor for receiving a reflected light from the projection surface 123 to detect the intensity of the reflected light (for example, a quantity of a current flowing through the photodiode according to an incident light). Then, the detected intensity of the reflected light is transmitted to the amplification section 410 as an analog light intensity signal.

Moreover, the light receiving sensor 400 is configured to receive (sense) a reflected light every scanning of the scanner mirror 372 (every rendering of one pixel), that is, at the timing when the time $\Delta T1$ of the PCLK shown in FIG. 4 elapses.

The amplification section 410 is, for example, a variable gain amplifier for an analog signal, which amplifier amplifies an input analog light intensity signal at an arbitrary gain. To put it more concretely, when an analog light intensity signal according to the intensity of a reflected light is input from the light receiving sensor 400, the amplification section 410 changes the gain thereof on the basis of a signal transmitted from the CPU 341 by the execution of a gain adjusting program 344b, which will be described later, and can amplify the input analog light intensity signal by the changed gain.

The conversion section 420 is, for example, a digital signal processor (DSP) capable of performing signal processing, such as an A/D conversion, filtering, and compression/expansion of input data, and converts an input analog light intensity signal into a digital light intensity signal. Consequently, the conversion section 420 converts an analog light intensity signal according to the intensity of a reflected light amplified by the amplification section 410 into a digital light intensity signal, and transmits the converted digital light intensity signal to the CPU 341.

The storage section 344 is, for example, a nonvolatile memory, and is equipped with a storage area to store programs executed by the CPU 341 and various pieces of data necessary for the execution of the programs. The storage area stores, for example, an amplification program 344a (amplification section, digital amplification section), a gain adjusting program 344b (determination section), gain data 344c, an identification program 344d (identification section), a calculation program 344e (calculation section), an update program 344f (update section), and the like.

The amplification program 344a is a program for causing the CPU 341 to execute a function of amplifying a digital light intensity signal according to the intensity of a reflected light converted into a digital signal by the conversion section 420 by the digital gain determined by the execution of the gain adjusting program 344b, which will be described later.

The gain adjusting program 344b is a program for causing the CPU 341 to execute a function of determining the amplification quantity (gain) of an analog/digital light intensity signal according to the intensity of a reflected light received by the light receiving sensor 400.

To put it concretely, when the CPU 341 executes the gain adjusting program 344b, the CPU 341 first specifies the reflection position of a reflected light received by the light receiving sensor 400.

That is, because the light receiving sensor 400 performs light receiving every scanning by the scanner mirror 372 as described above, it is possible to specify the position (reflection position) where the light receiving sensor 400 receives the reflected light by calculating the scanning position of the scanner mirror 372 at the elapsed time from the starting of the sensing by the light receiving sensor 400 to the receiving of the reflected light from the relation among the elapsed time, the time ΔT1 of the PCLK and the time ΔT2 of the HSTNC shown in FIG. 4.

Figure 6A:
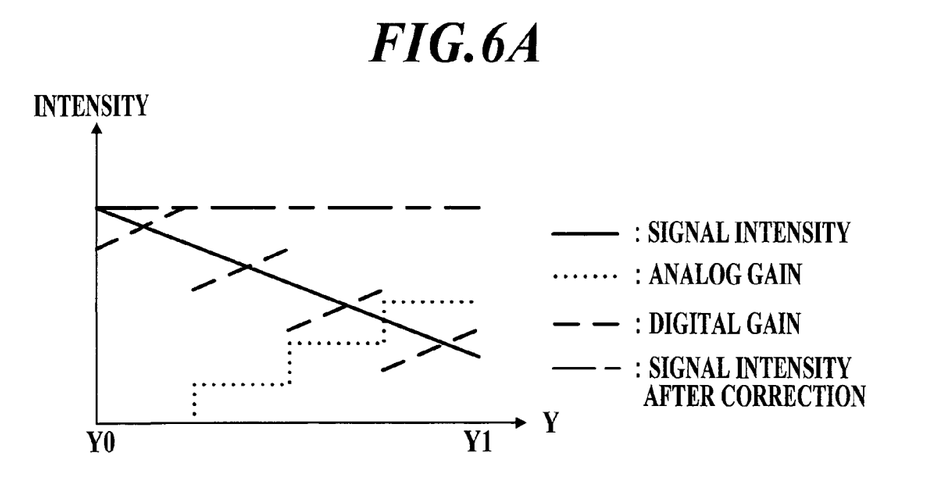
FIG. 6A is a diagram illustrating intensity distributions on a projection surface of reflected lights to be received by a light receiving sensor according to the present invention, and analog/digital gains at each position to show the intensity distributions in a Y direction.
Figure 6B:
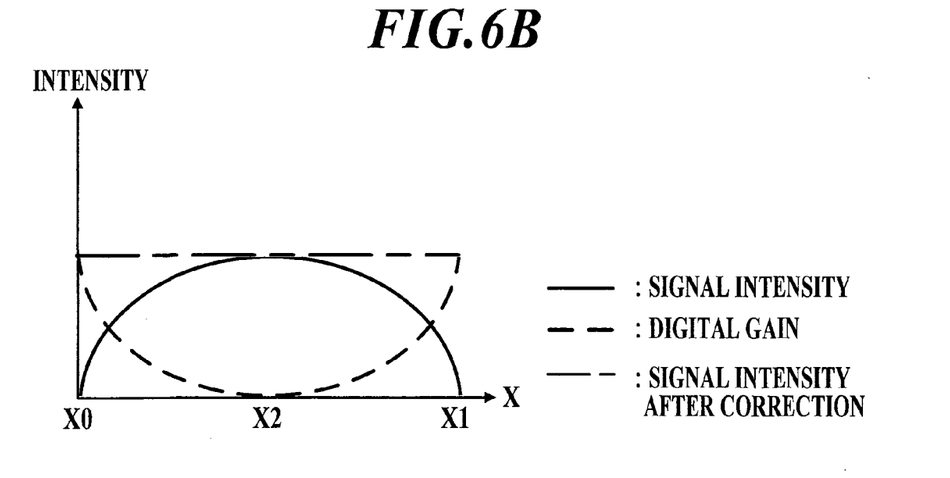
FIG. 6B is a diagram illustrating intensity distributions on a projection surface of reflected lights to be received by the light receiving sensor according to the present invention, and digital gain at each position to show an intensity distributions in an X direction.

Next, the CPU 341 determines the amplification quantity of the intensity of the reflected light from the X coordinate and the Y coordinate of the specified reflection position in accordance with the intensity distributions and analog/digital gains of FIGS. 6A and 6B.

Here, the solid lines in FIGS. 6A and 6B are lines schematically showing the intensities at the respective Y coordinates and the respective X coordinates, respectively, (that is, the distributions of the light receiving sensitivities of the light receiving sensor 400 at respective reflection positions) when the reflected lights reflected at the respective reflection positions on the projection surface 123 to have intensities of comparable levels are received by the light receiving sensor 400. Points Y0, Y1, X0 and X1 in FIGS. 6A and 6B correspond to the Y and X coordinates, respectively, of the corner points of the projection surface 123 in FIG. 3, and the point X2 is the middle point between the points X0 and X1 to indicate the X coordinate of the light receiving sensor 400.

First, as shown by the solid line in FIG. 6A, as the Y direction distance between the sensing position in FIG. 3 and the light receiving sensor 400 increases (as the sensing position becomes more distant from the light receiving sensor 400), the attenuation rate of the light intensity thereof becomes larger, and consequently the intensity of the reflected light (light receiving sensitivity) becomes smaller.

Accordingly, the light receiving sensitivity can be kept to be a predetermined value or more independently of the positions in the Y direction by, for example, determining the analog gain of the amplification section 410 to be a larger value every increase of the Y direction distance between the reflection position and the light receiving sensor 400 as shown in a dotted line in FIG. 6A. Furthermore, by amplifying the intensity of the reflected light, amplified by the analog gain mentioned above, by the digital gains shown by the broken lines shown in FIG. 6A, the changes of the intensity of the reflected light, which are like those of an inclined straight line, are corrected, so that the intensity of the reflected light is led to a straight line parallel to the Y axis as shown by the alternate long and short dash line of FIG. 6A. That is, by determining the digital gains of the amplification program 344a to the values shown by the broken lines of FIG. 6A, the light receiving sensitivity can be made to be uniform independent of the positions in Y direction.

On the other hand, because the attenuation rate of the light intensity becomes larger as the sensing position shown in FIG. 3 becomes more distant from the position where the X direction distance of the sensation position from the light receiving sensor 400 is nearest in the X direction (that is, the X coordinate of the reflection position changes from X2 to X0 or X1) as shown by the solid line in FIG. 6B, the intensity of the reflected light (light receiving sensitivity) becomes smaller. Accordingly, for example, by determining the digital gains expressed by a curved line that is symmetry to the axis passing the half values of the peak value of the solid line as shown by the broken line in FIG. 6B as the digital gain of the amplification program 344a, the light receiving sensitivity can be made to be uniform independent of positions in X direction.

Figure 7:
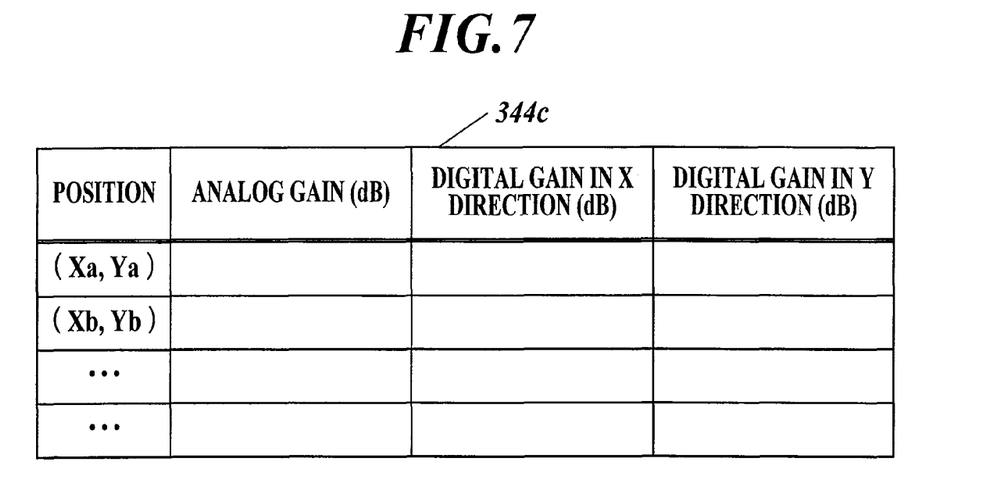
FIG. 7 is a diagram illustrating gain data according to the present invention.

Consequently, for example, as shown in FIG. 7, analog/digital gains at the respective positions on the projection surface 123 are determined beforehand in order to uniform the light receiving sensitivities at the respective reflection positions, and the analog/digital gains are previously stored in the storage section 344 as the gain data 344c. Then, when the CPU 341 executes the gain adjusting program 344b and the reflection position of a reflected light received by the light receiving sensor 400 is specified, the analog gain and the digital gains corresponding to the reflection position are extracted from the gain data 344c, and thereby light receiving sensitivities at the respective reflection positions can be uniformed.

Figure 8A:
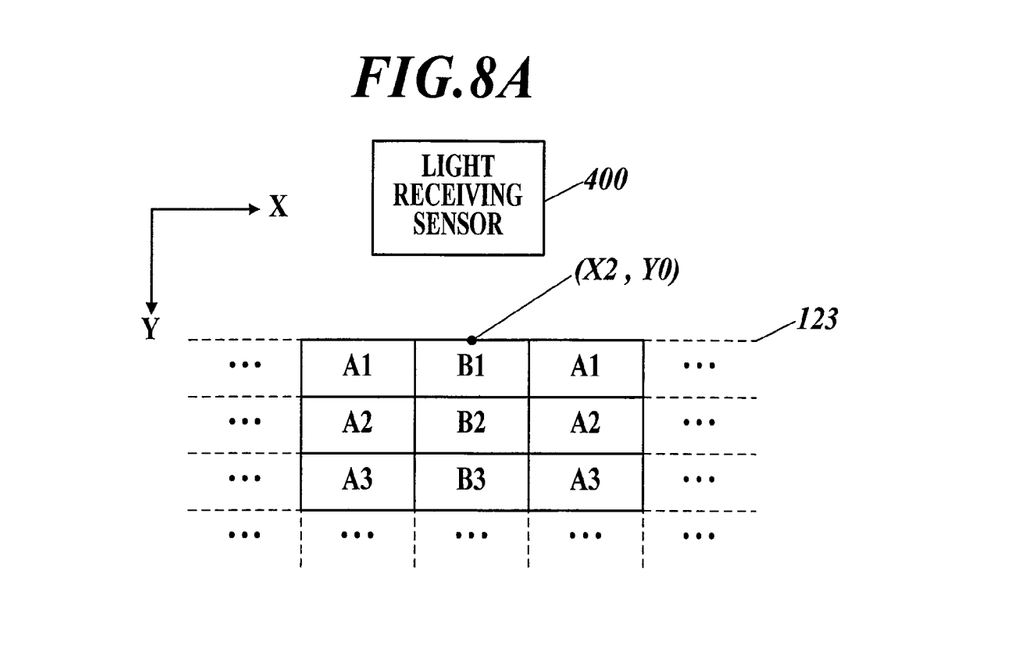
FIG. 8A is a diagram describing other gain data according to the present invention to show area divisions on a projection surface.
Figure 8B:
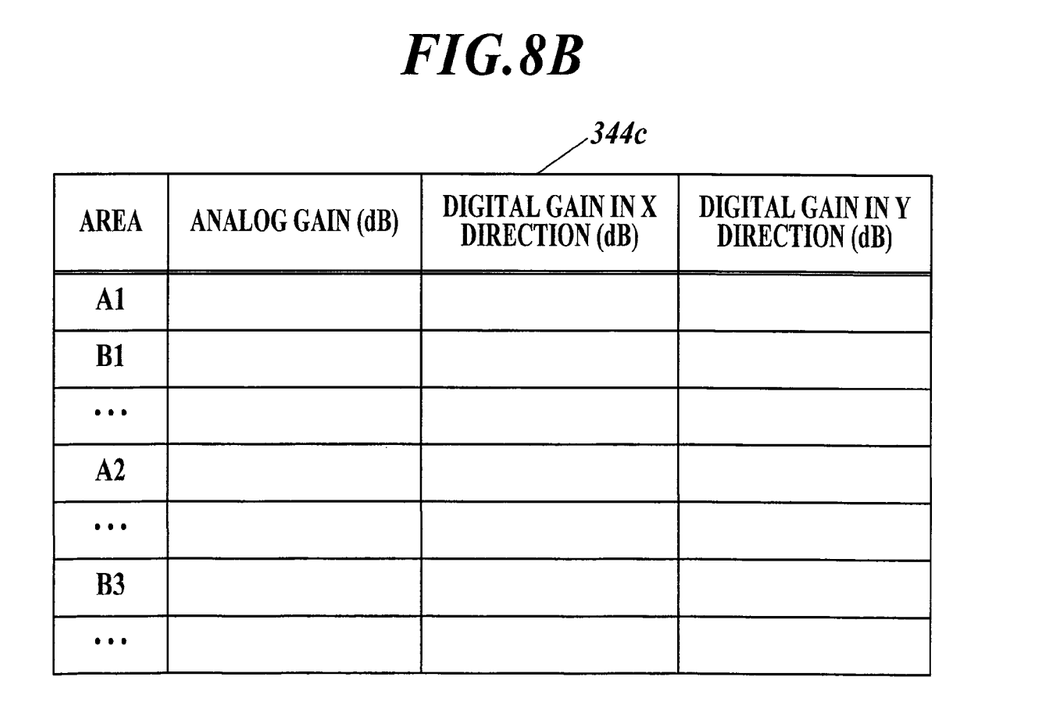
FIG. 8B is a diagram for illustrating other gain data according to the present invention to illustrate the other gain data.

Moreover, the gain data 344c may be, for example, the analog/digital data stored corresponding to each area (for example, areas A1, B1, A2, B2, . . . ) obtained by dividing the projecting surface 123 into a plurality of pieces beforehand on the basis of reflection positions as shown in FIGS. 8A and 8B. That is, as described above, if the analog/digital gains are determined at each reflection position and the amplification based on the gains is performed by the amplification section 410 and the execution of the amplification program 344a, then the uniformization of the light receiving sensitivities can accurately be realized, but it becomes necessary to change the gain every reception of a reflected light by the light receiving sensor 400 (every reflection position), and then the processing burden of the CPU 341 is apprehended. Accordingly, the necessity of changing the gain at every reflection position is removed by dividing the projection surface 123 into a plurality of areas and setting the analog/digital gains to values suitable for each area in advance in order that the light receiving sensitivity at each reflection position may become a predetermined value or more. Consequently, the increase of the processing burden of the CPU 341 can be suppressed, and the light receiving sensitivity at each reflection position can be ensured.

The identification program 344*d* is a program for causing the CPU 341 to execute the function of identifying the external obstacle 10 when the intensity of a reflected light amplified by the amplification section 410 and the execution of the amplification program 344*a* exceeds a predetermined threshold value.

Figure 9:
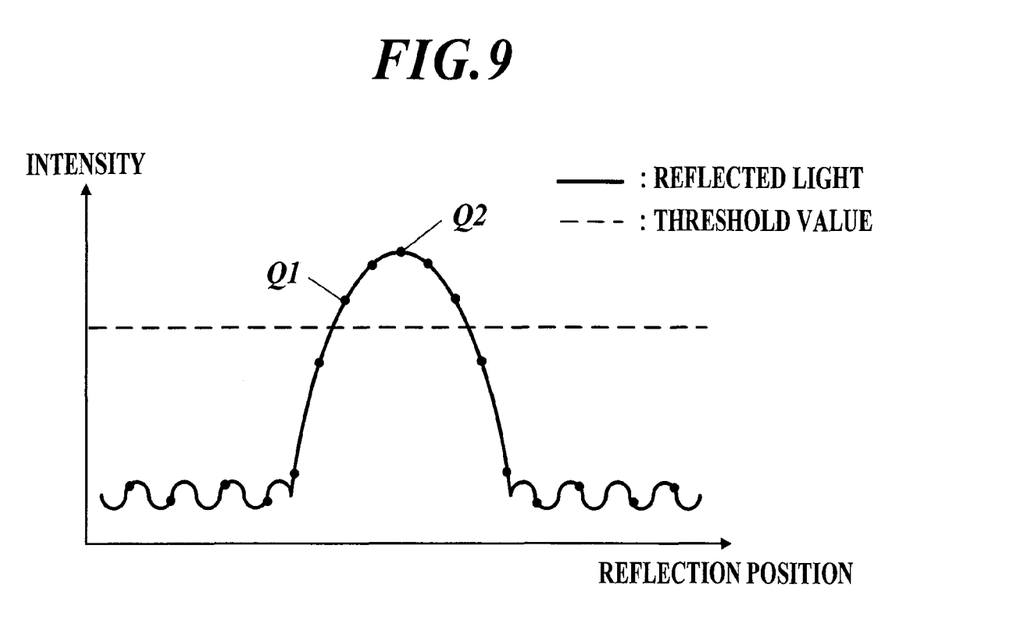
FIG. 9 is a diagram illustrating an intensity distribution of an amplified reflected light on a certain scanning line.

To put it concretely, for example, it is supposed that the intensities of the reflected lights at the respective reflection positions on a certain scanning line (for example, a scanning line L passing the external obstacle 10 of FIG. 3) on the projection surface 123 form the distribution as shown in FIG. 9 (each point in FIG. 9 corresponds to each reflection position), which intensities are amplified by the amplification section 410 and the execution of the amplification program 344*a* on the basis of the amplification quantities detected by the light receiving sensor 400 and determined by the execution of the gain adjusting program 344*b*. In this case, the CPU 341 executes the identification program 344*d* to perform the comparison of a previously determined threshold value of the intensities of reflected lights and the intensities of the reflected lights at the respective positions at every detection of the intensity of a reflected light by the light receiving sensor 400, and identifies the external obstacle 10 at the timing when the intensity of a reflected light first exceeds the threshold value (that is, at the timing when the intensity at the point Q1 in FIG. 9 is detected by the light receiving sensor 400).

The calculation program 344*e* is a program for causing the CPU 341 to execute the function of calculating the position information of the external obstacle 10 on the basis of the timing of identifying the external obstacle 10 by the execution of the identification program 344*d*, a horizontal synchronizing signal and a pixel clock signal.

To put it concretely, for example, when the CPU 341 executes the calculation program 344*e*, the CPU 341 calculates a scanning position of the scanner mirror 372 at an elapsed time from the relations among the elapsed time, the time ΔT1 of the PCLK and the time ΔT2 of the HSYNC shown in FIG. 4, which elapsed time is a time from the starting of sensing by the light receiving sensor 400 to the timing when the intensity of the reflected light detected by the light receiving sensor 400 first exceeds the threshold value by the execution of the identification program 344*d*. Thereby, the position (position information) of the external obstacle 10 can be specified.

The update program 344*f* is a program for causing the CPU 341 to execute the function of updating the gain determined by the execution of the gain adjusting program 344*b* at every predetermined period (for example, every projection of image signals for several frames) on the basis of the peak value of the intensity of the reflected light amplified by amplification section 410 and the execution of the amplification program 344*a*.

To put it concretely, when the CPU 341 executes the update program 344*f*, the CPU 341 obtains, for example, the intensity of the reflected light at each reflection position in a scanning line (for example, the scanning line L of FIG. 3, in which the point Q1 of FIG. 9 is included) including the position identified as the external obstacle 10 by the execution of the identification program 344*d* as shown in FIG. 9. Then, the CPU 341 extracts a peak value of the intensities (for example, the intensity of the point Q2 in FIG. 9), and calculates new analog/digital gains on the basis of a difference quantity between the peak value and a peak value (target value) of the intensities stored in the storage section 344 beforehand, and updates the gain of the gain data 344*c* on the basis of the calculated value. The peak value of the intensities stored in the storage section 344 is updated to the extracted peak value after the execution of the update program 344*f* by the CPU 341.

That is, the gain of the gain data 344*c* is not made to be a fixed value, and a new gain is determined every predetermined period by reflecting the gain before the change (the peak value of the intensities of the reflected lights amplified by the gain before the change) to make it possible to improve the light receiving sensitivity of the light receiving sensor 400 to the more suitable one.

[Gain Adjustment Processing]

Figure 10:
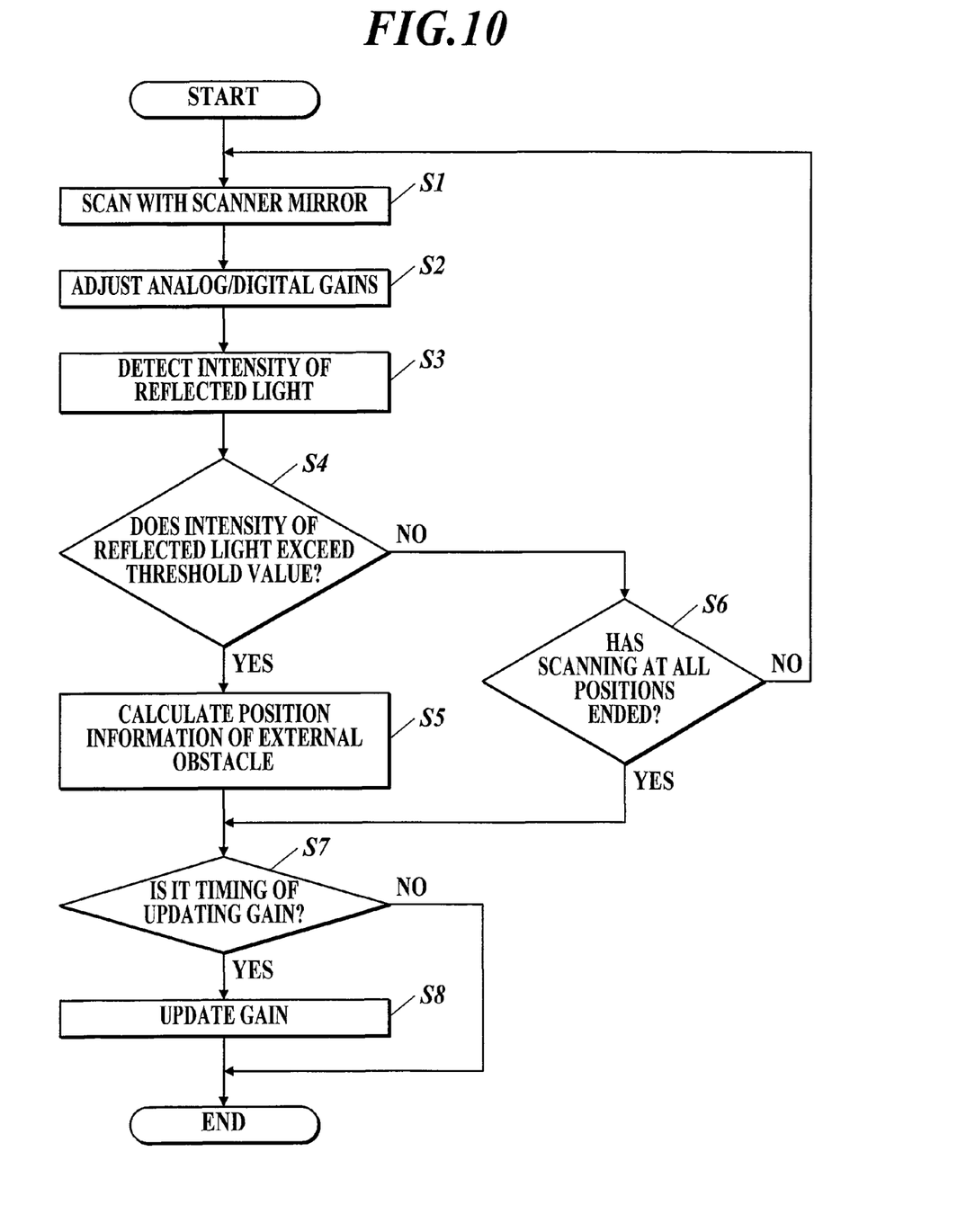
FIG. 10 is a flow chart for describing gain adjustment processing by the projector according to the present invention.

Next, a flow of the gain adjustment processing performed by the projector 100 in the present embodiment will be described with reference to the flow chart of FIG. 10.

First, the scanner mirror 372 performs the scanning of the projection surface 123, and the light receiving sensor 400 performs sensing (Step S1).

Next, the CPU 341 executes the gain adjusting program 344*b* to specify a position (reflection position) where the light receiving sensor 400 received a reflected light at Step S1, refer to the gain data 344*c* and perform the adjustments of the analog gain of the amplification section 410 and the digital gains of the amplification program 344*a* at the specified position (Step S2).

Next, the amplification section 410 amplifies the analog light intensity signal of the reflected light detected by the light receiving sensor 400 on the basis of the analog/digital gains adjusted at Step S2, and the CPU 341 executes the amplification program 344*a* to amplify the digital light intensity signal, which is a digitally converted analog light intensity signal by the conversion section 420. Thereby, the CPU 340 detects the intensity of the reflected light (Step S3).

Next, the CPU 341 executes the identification program 344*d* to identify whether the intensity of the reflected light detected at Step S3 exceeds the threshold value or not (Step S4).

Then, if the CPU 341 identifies that the intensity of the reflected light exceeds the threshold value at Step S4 (identifies the external obstacle 10) (Step S4: Yes), then the CPU 341 executes the calculation program 344*e* to calculate the position information of the external obstacle 10 (Step S5).

On the other hand, if the CPU 341 identifies that the intensity of the reflected light does not exceed the threshold value at Step S4 (Step S4: No), then the CPU 341 identifies whether the scanning is completed by the scanner mirror 372 at all positions on the projection surface 123 or not (the reflected lights at all reflection positions have been received by the light receiving sensor 400 or not) (Step S6).

Then, if the CPU 341 identifies that the scanning has ended at Step S6 (Step S6: Yes), then the CPU 341 executes the processing at Step S7. If the CPU 341 identifies that the scanning has not ended (Step S6: No), then the CPU 341 repeats the processing at and after Step S1.

Next, the CPU 341 identifies whether it is a timing of updating the gain of the gain data 344*c* or not (Step S7).

If the CPU 341 identifies that it is the timing of performing the update at Step S7 (Step S7: Yes), then the CPU 341 executes the update program 344*f* to update the gain of the gain data 344*c* (Step S8), and ends the present processing.

On the other hand, if the CPU 341 identifies that it is not the timing of updating at Step S7 (Step S7: No), the CPU 341 ends the present processing without updating the gain of the gain data 344*c*.

As described above, the projector 100 according to the present invention is characterized by LDs 361 and 362 to supply laser lights according to an input image signal, a scanner mirror 372 to perform scanning with the laser lights supplied from the LDs 361 and 362, a beam splitter 383 to divide each of the laser lights scanned with the scanner mirror 372 into a first direction and a second direction to output the divided laser lights, a light receiving sensor 400 to receive the reflected lights of the first laser lights output into the first direction by the beam splitter 383, a gain adjusting program 344b to specify the reflection positions of the reflected lights received by the light receiving sensor 400 on the basis of the horizontal synchronizing signal and the pixel clock signal of the image signal to determine the gains of the intensities of the reflected lights reflected at the specified reflection positions and received by the light receiving sensor 400, an amplification section 410 and an amplification program 344a to amplify the intensities of the reflected lights received by the light receiving sensor 400 by the gain determined by the gain adjusting program 344b, an identification program 344d to identify an external obstacle 10 when the intensity of a reflected light amplified by the amplification section 410 and the amplification program 344a exceeds a predetermined threshold value, and a calculation program 344e to calculate the position information of the external obstacle 10 on the basis of the timing of identification of the external obstacle 10 by the identification program 344d, the horizontal synchronizing signal and the pixel clock signal of the image signal.

According to the present invention, because the projector 100 is configured to specify the reflection position of a reflected light received by the light receiving sensor 400 by the execution of the gain adjusting program 344b with the CPU 341, and to determine the gain of the intensity of the reflected light reflected at the specified reflection position and received by the light receiving sensor 400, it becomes possible to adjust the gain in consideration of the influences of the attenuation rate of the light intensity of a reflected light and the like according to the reflection position, and to suppress the dispersion of the identification accuracy of the external obstacle 10 according to reflection positions. Moreover, because the position information of the external obstacle 10 can easily be calculated by the execution of the calculation program 344e by the CPU 341 on the basis of the timing of identifying the external obstacle 10 by the execution of the identification program 344d, the horizontal synchronizing signal and the pixel clock signal, no particular configurations for the position detection of the external obstacle 10 are needed. Moreover, because the calculation of the position information is not performed on the basis of the light quantity of the reflected light received by the light receiving sensor 400, no complicated operations are also needed.

Consequently, the present invention can be said to concern a projector capable of easily executing the position detection of an external obstacle and having high identification accuracy of the external obstacle.

Moreover, in the projector described in the embodiment, the determination section may determine the amplification quantity on the basis of a distance between a reflection position of a reflected light received by the light receiving sensor and the light receiving sensor.

Concretely, when the CPU 341 executes the gain adjusting program 344b, the CPU 341 determines the gain on the basis of the distance between a reflection position and the light receiving sensor 400.

That is, because the projector 100 extracts the analog/digital gains corresponding to each reflection position from the gain data 344c determining the analog/digital gains on the basis of a distance between each reflection position and the light receiving sensor 400, the light receiving sensitivity at each reflection position can be uniformed.

Moreover, in the projector described in the embodiment, the determination section may identify an area to which a reflection position of a reflected light received by the specified light receiving sensor belongs among a previously divided plurality of areas, and may determine the amplification quantity in each area.

Concretely, the gain adjusting program 344b may be a program for identifying an area to which a specified reflection position belongs among a plurality of previously divided areas to determine a gain in each area.

That is, because it becomes unnecessary to change a gain to each reflection position by dividing the projection surface 123 into areas and setting the analog/digital gains to the values suitable for each area in order that the light receiving sensitivity at each reflection position may be a predetermined value or more, the increase of the processing burden of the CPU 341 is suppressed and the light receiving sensitivity at each reflection position can be ensured.

Moreover, in the projector described in the embodiment, the amplification section may be equipped with an analog amplification section to amplify an analog light intensity signal according to the intensity of a reflected light received by the light receiving sensor, and a digital amplification section to amplify a digital light intensity signal generated by performing the A/D conversion of the analog light intensity signal.

Concretely, the projector 100 amplifies the analog light intensity signal of the intensity of a reflected light received by the light receiving sensor 400 with the amplification section 410, and amplifies the digital light intensity signals generated by performing the A/D conversion of the analog light intensity signal by the execution of the amplification program 344a by the CPU 341.

That is, the projector 100 amplifies the intensity of a reflected light received with the light receiving sensor 400 to a predetermined value or more by the amplification section 410, and then can perform more delicate adjustment of the amplification by the execution of the amplification program 344a by the CPU 341.

Moreover, in the projector described in the embodiment, the determination section may be equipped with an update section to update an amplification quantity every predetermined period on the basis of the peak value of the intensity of a reflected light amplified by the amplification section.

Concretely, the projector 100 can update the gain, determined by the execution of the gain adjusting program 344b, every predetermined period by the execution of the update program 344f by the CPU 341.

That is, it is possible to improve the light receiving sensitivity of the light receiving sensor 400 to more suitable sensitivity by determining a new gain every predetermined period by reflecting the peak value of the intensity of a reflected light amplified by the gain before a change without setting the gain of the gain data 344c to a fixed value.

The scope of the present invention is not limited to that of the embodiment described above, and the various improvements and changes of the design may be performed without departing from the spirit and the scope of the present invention.

For example, although the embodiment described above is configured to amplify the intensity of a reflected light detected by the light receiving sensor 400 through both of the amplification of an analog light intensity signal by the amplification section 410 and the amplification of a digital light intensity signal by the execution of the amplification program 344*a*, the one configured to amplify only either of the analog light intensity signal and the digital light intensity signal may be adopted.

Moreover, although the amplification of the digital light intensity signal of the intensity of a reflected light detected by the light receiving sensor 400 is configured to be performed by the execution of the amplification program 344*a*, for example, the amplification may naturally be performed by providing a digital amplifier or the like at the subsequent stage of the conversion section 420 (that is, between the conversion section 420 and the CPU 341 in FIG. 2).

Furthermore, although a galvanometer mirror is illustrated as the scanner mirror 372 in the embodiment described above, a two-dimensional micro electro mechanical system (MEMS) mirror capable of controlling a laser light in two axis directions independently may be used.

The entire disclosure of Japanese Patent Application No. 2009-092777 filed on Apr. 7, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A projector comprising:
   a laser light source to supply a laser light according to an input image signal;
   a scanning section to perform scanning with the laser light supplied from the laser light source;
   a beam splitter to divide the laser light, scanned by the scanning section, into a first direction and a second direction to output the divided pieces of the laser light;
   a light receiving sensor to receive a reflected light of a first laser light output into the first direction by the beam splitter;
   a determination section to specify a reflection position of the reflected light received by the light receiving sensor based on a horizontal synchronizing signal and a pixel clock signal of the image signal, and to determine an amplification quantity of an intensity of the reflected light reflected at the specified reflection position to be received by the light receiving sensor;
   an amplification section to amplify the intensity of the reflected light received by the light receiving sensor according to the amplification quantity determined by the determination section;
   an identification section to identify an external obstacle when the intensity of the reflected light amplified by the amplification section exceeds a predetermined threshold value; and
   a calculation section to calculate position information of the external obstacle based on a timing of identification of the external obstacle by the identification section, the horizontal synchronizing signal, and the pixel clock signal.

2. The projector according to claim 1, wherein the determination section determines the amplification quantity based on the reflection position of the reflected light received by the light receiving sensor and a distance from the light receiving sensor.

3. The projector according to claim 1, wherein the determination section identifies an area to which the specified reflection position of the reflected light received by the light receiving sensor belongs among a plurality of previously divided areas, and determines the amplification quantity in each of the areas.

4. The projector according to claim 1, wherein the amplification section includes:
   an analog amplification section to amplify an analog light intensity signal according to the intensity of the reflected light received by the light receiving sensor, and
   a digital amplification section to amplify a digital light intensity signal generated by performing an A/D conversion of the analog light intensity signal amplified by the analog amplification section.

5. The projector according to claim 1, wherein the determination section includes an update section to update the amplification quantity every predetermined period on the basis of a peak value of the intensity of the reflected light amplified by the amplification section.

6. A projector comprising:
   a laser light source to supply a laser light according to an input image signal;
   a scanning section to perform scanning with the laser light supplied from the laser light source;
   a beam splitter to divide the laser light, scanned by the scanning section, into a first direction and a second direction to output the divided laser lights;
   a light receiving sensor to receive a reflected light of a first laser light output into the first direction by the beam splitter;
   a determination section to specify a reflection position of the reflected light received by the light receiving sensor based on a horizontal synchronizing signal and a pixel clock signal of the image signal, and to determine an amplification quantity of an intensity of the reflected light reflected at the specified reflection position to be received by the light receiving sensor;
   an amplification section to amplify the intensity of the reflected light received by the light receiving sensor according to the amplification quantity determined by the determination section;
   an identification section to identify an external obstacle when the intensity of the reflected light amplified by the amplification section exceeds a predetermined threshold value; and
   a calculation section to calculate position information of the external obstacle based on a timing of identification of the external obstacle by the identification section, the horizontal synchronizing signal, and the pixel clock signal, wherein
   the amplification section includes:
   an analog amplification section to amplify an analog light intensity signal according to the intensity of the reflected light received by the light receiving sensor, and
   a digital amplification section to amplify a digital light intensity signal generated by performing an A/D conversion of the analog light intensity signal amplified by the analog amplification section; and
   the determination section determines the amplification quantity based on a distance between the reflection position of the reflected light received by the light receiving sensor and the light receiving sensor.

* * * * *